(12) United States Patent
Zampiello

(10) Patent No.: US 8,031,854 B2
(45) Date of Patent: Oct. 4, 2011

(54) METHODS, SYSTEMS, AND PRODUCTS FOR PROVIDING RING BACKS

(75) Inventor: Geoffrey Zampiello, Norwalk, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 506 days.

(21) Appl. No.: 12/254,286

(22) Filed: Oct. 20, 2008

(65) Prior Publication Data

US 2010/0098223 A1    Apr. 22, 2010

(51) Int. Cl.
*H04M 3/42*    (2006.01)
(52) U.S. Cl. ......... 379/207.16; 379/373.03; 379/374.01; 379/374.02; 455/567
(58) Field of Classification Search ............. 379/207.16, 379/373.01–373.02; 455/567, 91
See application file for complete search history.

(56) References Cited

U.S. PATENT DOCUMENTS

| 5,815,503 | A | 9/1998 | Li |
| 6,574,335 | B1 | 6/2003 | Kalmanek, Jr. |
| 6,694,429 | B1 | 2/2004 | Kalmanek, Jr. |
| 7,010,112 | B2 * | 3/2006 | Lee et al. .................. 379/207.16 |
| 2002/0131574 | A1 | 9/2002 | Alleman |
| 2003/0086558 | A1 | 5/2003 | Seelig |
| 2006/0023862 | A1 * | 2/2006 | Sutcliffe ....................... 379/257 |

* cited by examiner

*Primary Examiner* — Simon Sing
*Assistant Examiner* — Assad Mohammed
(74) *Attorney, Agent, or Firm* — Scott P. Zimmerman PLLC

(57) ABSTRACT

Methods, systems, and products are disclosed for providing a ring back to a calling party's communications device. A first call is placed to a called number. An identification sequence is received during the first call. When the first call ends, a second call is placed to a server. The identification sequence is sent to the server during the second call, and the ring back associated with the identification sequence is received. The ring back is stored in memory of the calling party's communications device and retrieved when subsequent calls are made to the called number. The ring back is then presented on the calling party's communications device to indicate the called number is ringing.

20 Claims, 18 Drawing Sheets

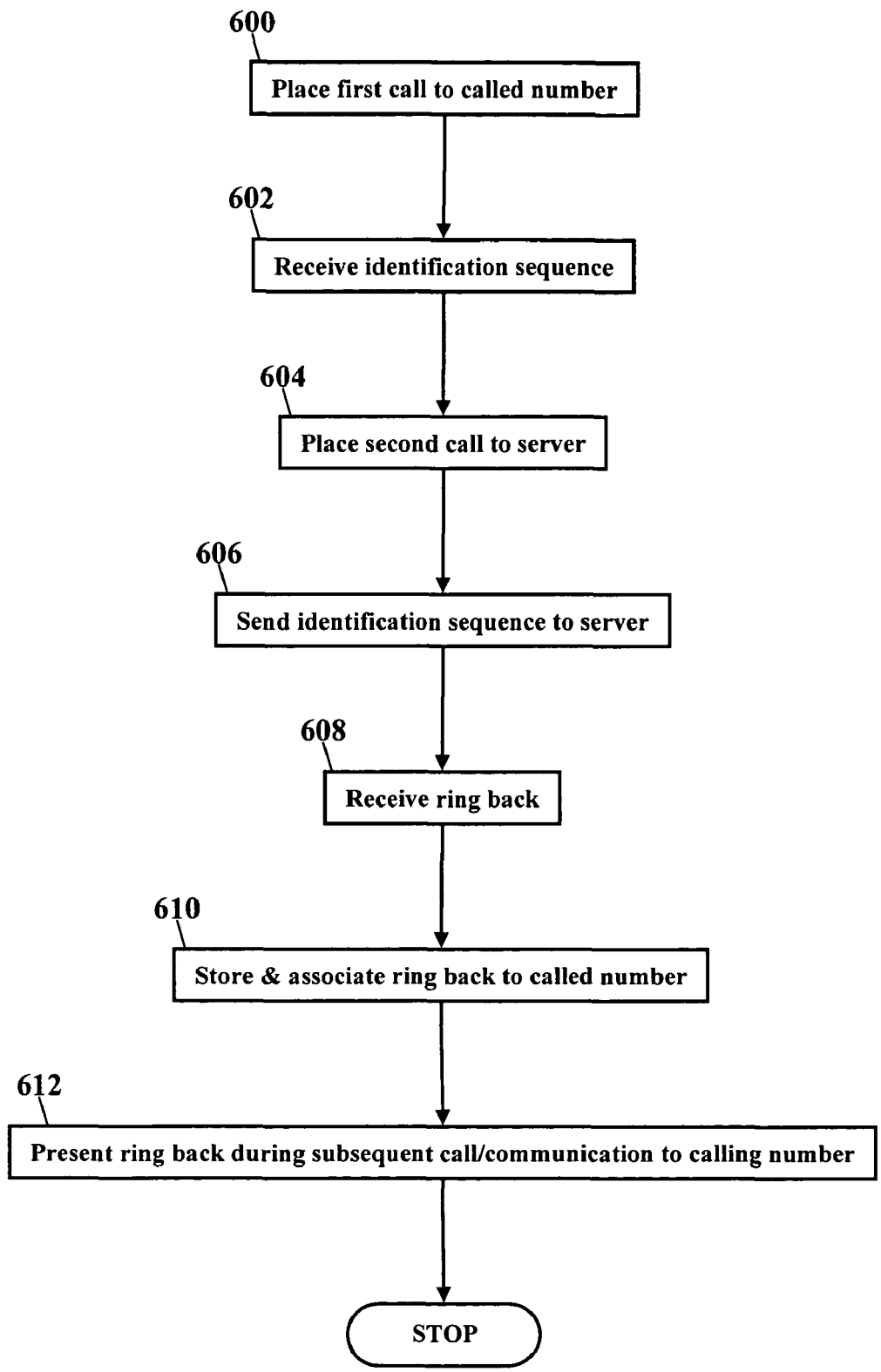

METHODS, SYSTEMS, AND PRODUCTS FOR PROVIDING RING BACKS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

Exemplary embodiments generally relate to telephonic communications and to telecommunications and, more particularly, to supervisory control line signaling, to special services and programming control in a radiotelephone system, and to transceiver call alerting.

Personalized phones are very popular. Mobile phones, for example, can be personalized with selected ring tones, colorful and themed covers, and even more unique phone designs. Recently customers can even download songs and other ring tones to further personalize their phones. Customers desire these personalized features, and these personalized features are profitable for the service provider. Service providers and customers thus benefit from an ever expanding selection of personalized features.

BRIEF SUMMARY OF THE INVENTION

Exemplary embodiments provide methods, systems, apparatuses, and products for a ring back service. This ring back service may be personalized by a subscriber, and this ring back service provides an additional revenue opportunity for the service provider. This ring back service provides a customizable alert to a calling party, and this customizable alert means the called party's communications device is ringing, vibrating, or otherwise alerting to an incoming telephone call, email, or other communication. As most people know, when a telephone call is placed, the calling party hears a "ring back" tone. This ring back tone indicates the called party's terminal is ringing, or otherwise alerting, to the incoming call.

Exemplary embodiments include a method of providing a personalized ring back. A first call is placed to a called number. An identification sequence is received during the first call. A second call is placed to a server when the first call is completed. An identification sequence is sent to the server during the second call. The personalized ring back is received during the second call and stored. When subsequent calls are made to the called number, the personalized ring back is retrieved from memory and presented to the calling party.

Other exemplary embodiments include a processor-controlled device that provides a ring back. The processor-controlled device is operative to place a first call to a called number. An identification sequence is received during the first call. A second call is placed to a server when the first call is completed. An identification sequence is sent to the server during the second call. The personalized ring back is received during the second call and stored. When subsequent calls are made to the called number, the personalized ring back is retrieved from memory and presented to the calling party.

More exemplary embodiments describe a computer readable storage medium that stores processor-executable instructions for performing a method of providing a ring back to a calling party's communications device. A first call is placed to a called number. An identification sequence is received during the first call. A second call is placed to a server when the first call is completed. An identification sequence is sent to the server during the second call. The personalized ring back is received during the second call and stored. When subsequent calls are made to the called number, the personalized ring back is retrieved from memory and presented to the calling party.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 18 and 19 are flowcharts illustrating methods of providing the personalized ring back, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
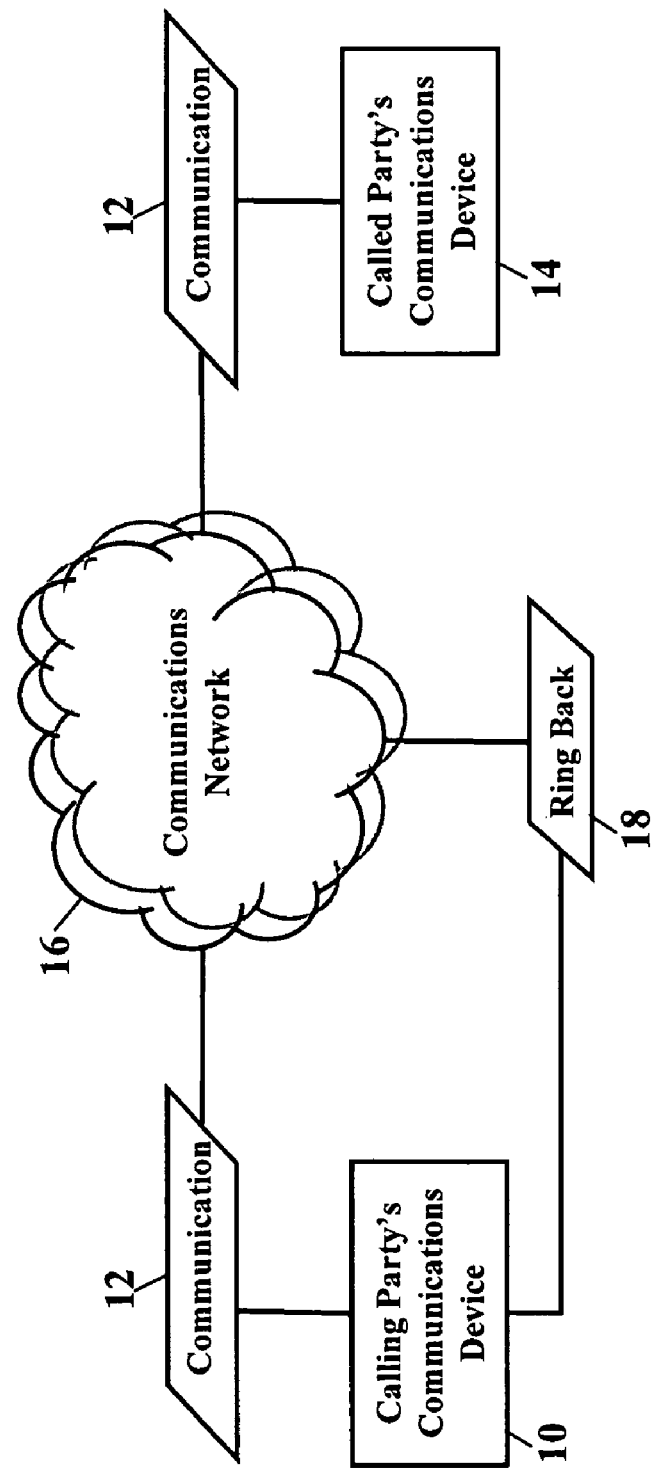
FIG. 1 is a simplified schematic illustrating a ring back service, according to exemplary embodiments.

FIG. 1 is a simplified schematic illustrating a ring back service, according to exemplary embodiments. A calling party, using the calling party's communications device 10, initiates a communication 12 to a called party's communications device 14. The communication 12 may be any form of electronic communication (such as an email, instant message, page, or facsimile communication), a Plain Old Telephone System telephone call, and/or an Internet Protocol telephone call. The communication 12 routes from the calling party's communications device 10 to the called party's communications device 14 via a communications network 16. When the communication 12 is received, the called party's communications device 14 may ring, vibrate, flash, buzz, or otherwise alert to the incoming communication 12.

The calling party's communications device 10 also alerts. The calling party sees/hears/feels a ring back 18. This ring back 18 alerts the calling party that the called party's communications device 14 is ringing, vibrating, or otherwise alerting of the incoming communication 12. That is, when the calling party sees/hears the ring back 18, the calling party recognizes that the called party's communications device 14 is ringing.

Exemplary embodiments, however, allow the called party to specify the ring back 18. If the called party and/or the calling party subscribes to this ring back service, the called party may select the ring back 18 that is presented to the calling party. When the calling party sees/hears the ring back 18, that ring back 18 is personalized by the called party subscriber. The ring back 18 may be any music, tone(s), and/or graphics selected by the called party. The called party, for example, may select an .mp3 file to be presented to the calling party. The calling party might also view a picture, portions of a movie, or other graphics. The called party might even select personal pictures, self-composed music, or other content. The called party subscriber could even specify streamed audio and/or video content, such as radio, stock quotes, news, weather, and/or advertisements. The called party could also use logical rules for specifying ring backs. These logical rules might specify ring backs by the month, the day of the week, and/or the time of day. As further explained herein, the called party subscriber may even associate particular ring backs to particular calling parties, thus providing a variety of personalized ring backs.

Figure 2:
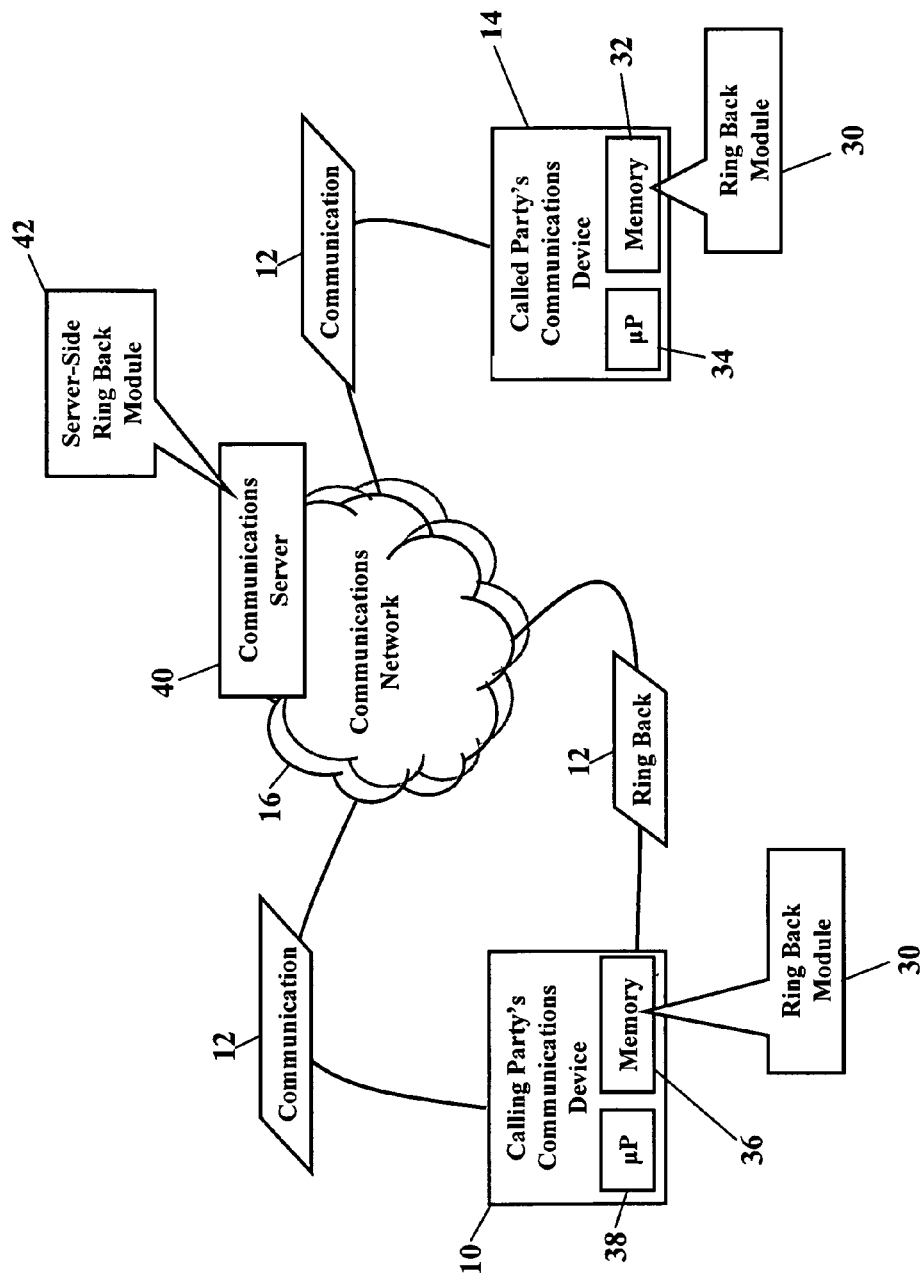
FIGS. 2-5 are more detailed schematics illustrating the ring back service, according to more exemplary embodiments.

FIGS. 2-5 are more detailed schematics illustrating the ring back service, according to more exemplary embodiments. When the communication 12 is received, the called party's communications device 14 rings, vibrates, and/or otherwise alerts to the incoming communication 12. The calling party's communications device 10, however, may also alert. As FIG. 2 illustrates, the called party's communications device 14 may store a ring back module 30 in memory 32, and a processor 34 communicates with the memory 32 to execute the ring back module 30. The ring back module 30 may be a set of processor executable instructions that control or manage the ring back service for the called party.

The calling party's communications device 10 may also execute the ring back module 30. The calling party's communications device 10 may store the ring back module 30 in memory 36 of the calling party's communications device 10. A processor 38 may communicate with the memory 36 and execute the ring back module 30. The ring back module 30 may similarly control or manage the ring back service for the calling party. The ring back module 30 may comprise methods, computer programs, and/or computer program products that help provide the ring back 18 at the calling party's communications device 10.

FIG. 2 also illustrates a communications server 40. The communications server 40 operates at any location within the communications network 16. The communications server 40 may store and execute a server-side ring back module 42. Although not shown for simplicity, the server-side ring back module 42 may be stored in the memory of the communications server 40. A processor may communicate with the server's memory and execute the server-side ring back module 42. The ring back module 30 and the server-side ring back module 42 may cooperate to provide the ring back 18 at the calling party's communications device 10.

Personalized ring backs are provided to the calling party. As the communication 12 is communicated to the called party's communications device 14, exemplary embodiments determine if the personalized ring back service is required. If the personalized ring back 18 is required, the ring back module 30 and/or the server-side ring back module 42 may cooperate to provide the personalized ring back 18, as the following paragraphs will explain. The personalized ring back 18 is presented at the calling party's communications device 10 to alert that the called party's communications device 14 is ringing, vibrating, or otherwise alerting of the incoming communication 12.

Figure 3:
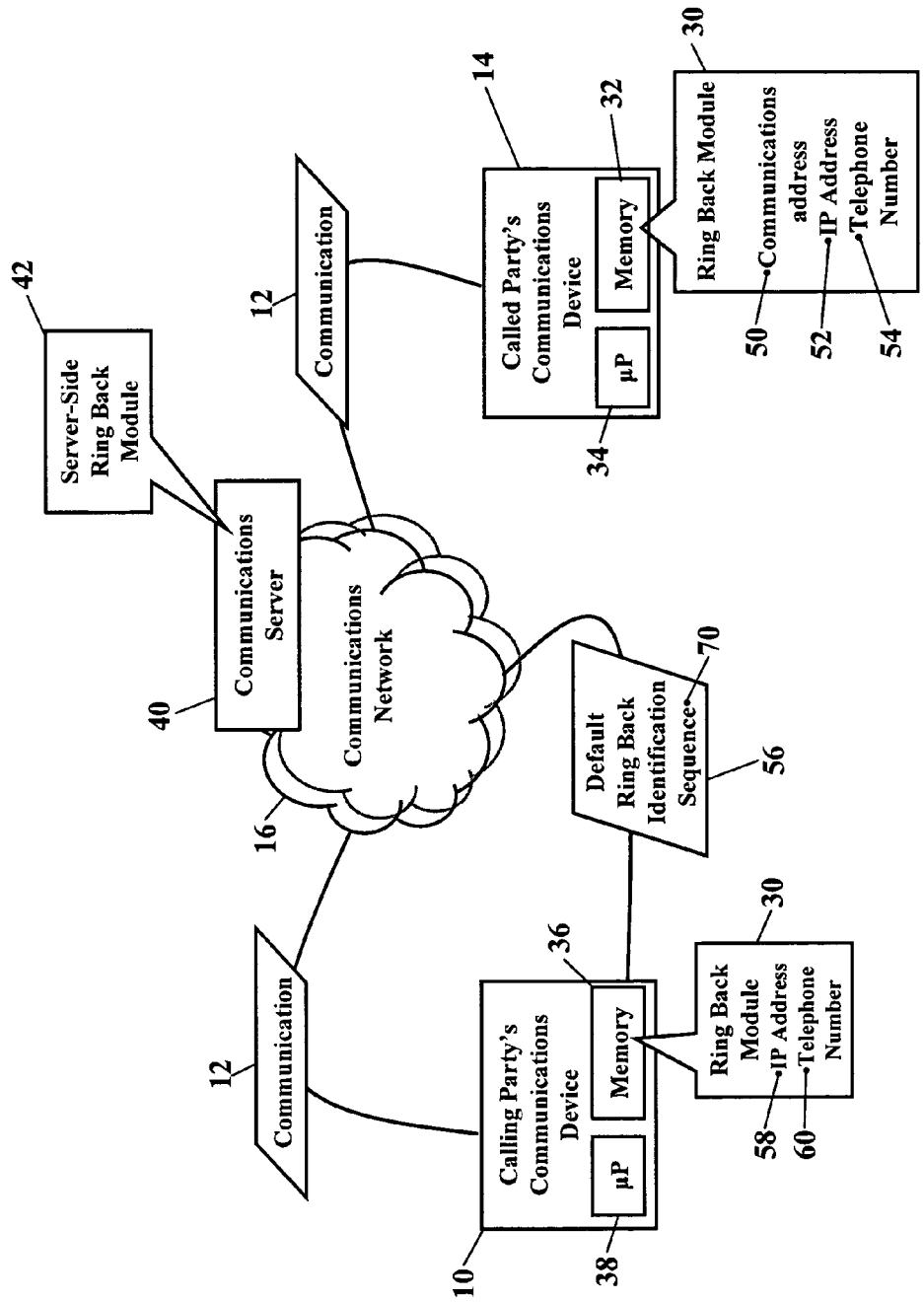

FIG. 3 continues illustrating the ring back service, according to exemplary embodiments. When the calling party's communications device 10 initiates or sends the communication 12 to the called party's communications device 14, the communication 12 routes to a communications address 50 associated with the called party's communications device 14. If the communication 12 is an email or Voice-over Internet Protocol call, for example, then the communication 12 may route to an Internet Protocol address 52 associated with the called party's communications device 14. If the communication 12 is a telephone call or Voice-over Internet Protocol call, then the communication 12 may route to a called telephone number 54 associated with the called party's communications device 14.

The calling party's communications device 10 may then receive or produce a default ring back 56. The default ring back 56 is a standard or generic ring back to indicate that the called party's communications device 14 is alerting of the incoming communication 12. The default ring back 56 may originate from the called party's communications device 14 and/or from the communications server 40. When the called party's communications device 14 receives, detects, or is informed of the incoming communication 12, for example, the ring back module 30 (operating in the called party's communications device 14) may retrieve the default ring back 56 from the memory 32 of the called party's communications device 14. The ring back module 30 then causes the processor 34 to send the default ring back 56 to the calling party's communications device 10. The default ring back 56, for example, may route or communicate to a communications address (e.g., an Internet Protocol address 58 or calling telephone number 60) associated with the calling party's communications device 10. The communications server 40, likewise, may send the default ring back 56 to the calling party's communications device 10. When the server-side ring back module 42 receives, detects, or is notified of the incoming communication 12, the server-side ring back module 42 may retrieve the default ring back 56 from memory and send the default ring back 56 to the communications address associated with the calling party's communications device 10. The default ring back 56, alternatively or additionally, may be locally retrieved from the memory 36 of the calling party's communications device 10.

Regardless, the default ring back 56 may comprise an identification sequence 70. When the calling party's communications device 10 receives the default ring back 56, ring back module 30 instructs the processor 38 to inspect the default ring back 56 for the identification sequence 70. The ring back module 30 causes the calling party's communications device 10 to audibly and/or visually present the default ring back 56. The ring back module 30 also causes the processor 38 to store the identification sequence 70 in the memory 36 of the calling party's communications device 10.

Figure 4:
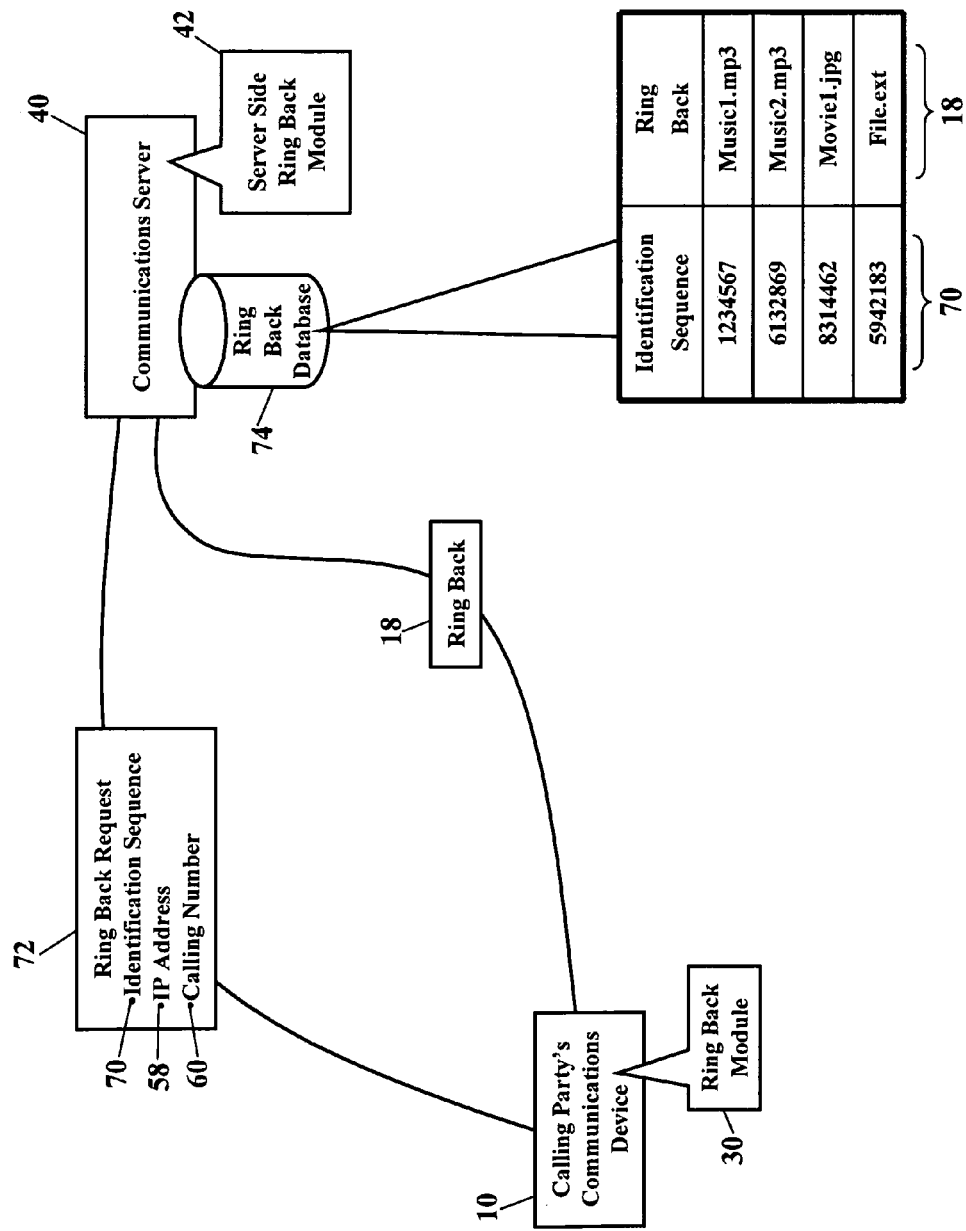

FIG. 4 illustrates retrieval of the personalized ring back 18, according to exemplary embodiments. After the identification sequence 70 is received, the calling party's communications device 10 may then contact the communications server 40. The ring back module 30 may cause the calling party's communications device 10 to send the identification sequence 70 to the communications server 40. The calling party's communications device 10, for example, may send a ring back request 72 to the communications server 40, and the ring back request 72 may comprise the identification sequence 70. The ring back request 72 may also comprise the Internet Protocol address 58 and/or the telephone number 60 associated with the calling party's communications device 10. When the communications server 40 receives the ring back request 72, the server-side ring back module 42 acquires the identification sequence 70. The server-side ring back module 42 then instructs the server's processor to query a ring back database 74 for the identification sequence 70. The ring back database 74 is illustrated as being locally stored in the communications server 40, but the ring back database 74 may be remotely located and accessible within the communications network (illustrated as reference numeral 16 in FIG. 1). Regardless, the communications server 40 queries the ring back database 74 for the identification sequence 70. FIG. 4 illustrates the ring back database 74 as a table or map that relates personalized ring backs 18 to the identification sequences 70. The ring back database 74 retrieves the personalized ring back 18 associated with the identification sequence 70 received from the ring back request 72. The server-side ring back module 42 then causes the communications server 40 to send or communicate the personalized ring back 18 to the calling party's communications device 10. The communications server 40, for example, sends or routes the .mpg file, .wav file, or picture to the communications address (e.g., Internet Protocol address 58 or telephone number 60) associated with the calling party's communications device 10.

Figure 5:
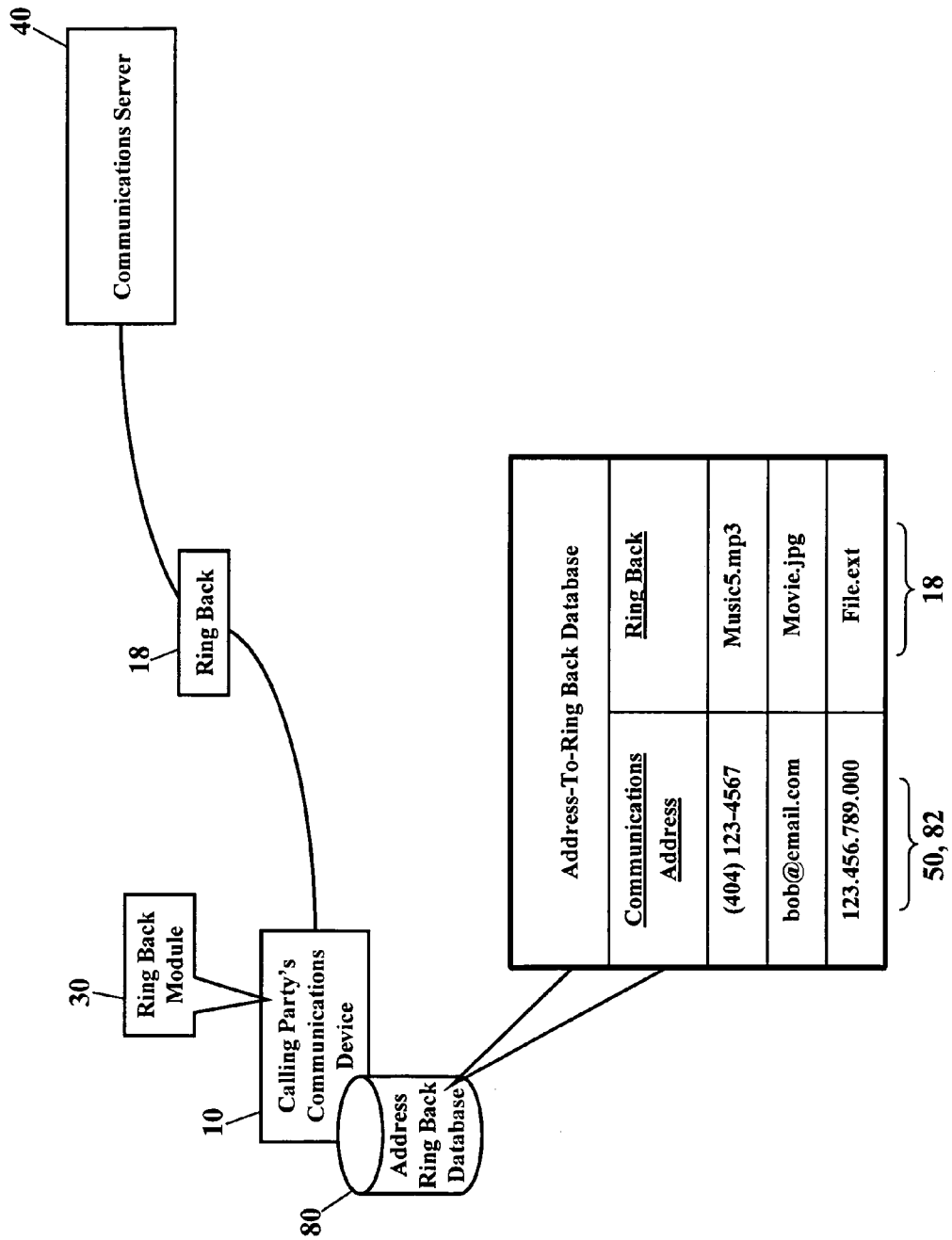

As FIG. 5 illustrates, the calling party's communications device 10 receives the personalized ring back 18. The ring back module 30 stores the personalized ring back 18 in the memory (illustrated as reference numeral 36 of FIG. 2) of the calling party's communications device 10. The ring back module 30 also associates the personalized ring back 18 to the called party's communications address 50 (such as the called party's Internet Protocol address 52 or called telephone number 54 illustrated in FIG. 3). The ring back module 30 may maintain or store an address-to-ring back database 80 in the memory 36 of the calling party's communications device 10. FIG. 5 illustrates the address-to-ring tone database 80 as a table that relates or maps the personalized ring back 18 to the called party's communications address 50. When the calling party initiates or sends a subsequent communication to the called party, the ring back module 30 queries the address-to-ring tone database 80 for the recipient's communications address 50. The ring back module 30 retrieves the personalized ring back 18 that corresponds to the recipient's communications address 50. The calling party's communications device 10 then audibly and/or visually presents the personalized ring back 18 that corresponds to the recipient's communications address 50. The personalized ring back 18 alerts the calling/sending party that the called/recipient party's communications device 14 is ringing, vibrating, or otherwise alerting to a the subsequent communication.

Figure 6:
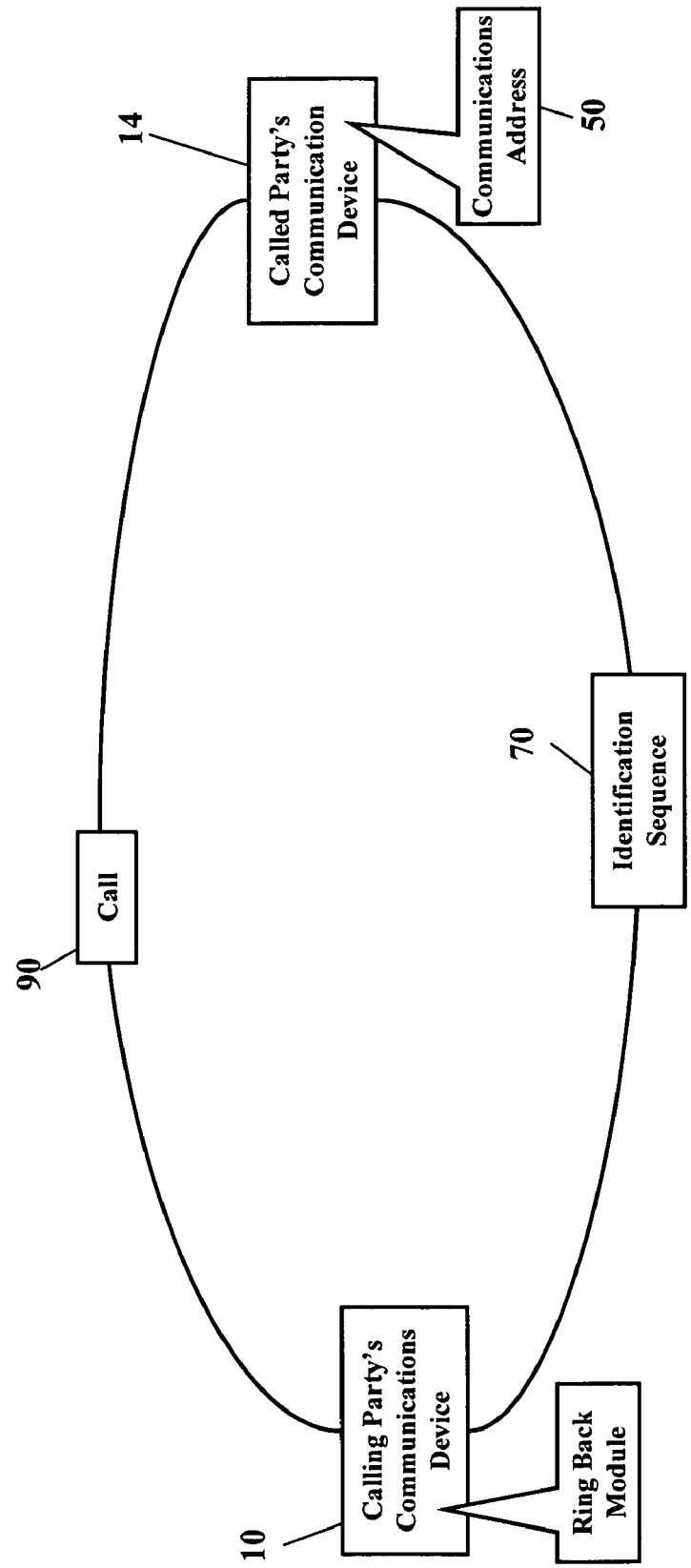
FIGS. 6-7 are schematics illustrating a telephony ring back, according to exemplary embodiments.
Figure 7:
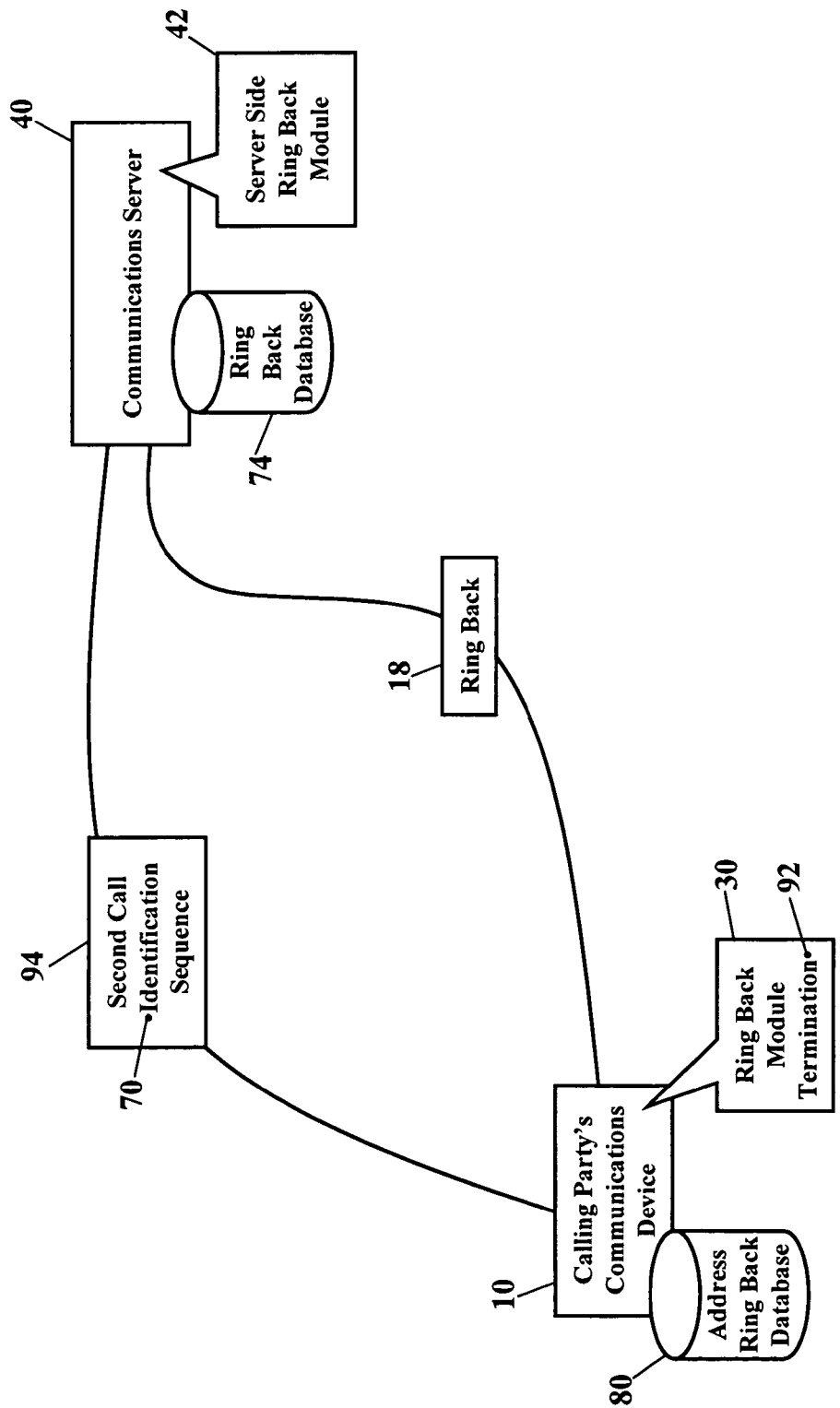

FIGS. 6 and 7 are schematics illustrating a telephony ring back, according to exemplary embodiments. Here the calling party's communications device 10 places a telephone or Voice-over Internet Protocol call 90 to the called party's communications device 14. The call 90 routes and terminates to the communications address 50 associated with the called party's communications device 14. The communications address 50 may be the called party's Internet Protocol address 52 or called telephone number 54, as illustrated in FIG. 3. As the calling party and the called party conduct the call 90 (or Voice-over Internet Protocol data session), the called party's communications device 14 sends the identification sequence 70 to the calling party's communications device 10. The identification sequence 70 may be sent as a data message, a burst of data, or dual-tone modal frequencies during the call or data session. However the identification sequence 70 is sent, the ring back module 30 receives or detects the identification sequence 70. The ring back module 30 stores the identification sequence 70 in the memory (illustrated as reference numeral 36 in FIG. 2) of the calling party's communications device 10. The calling party and the called party continue to converse until the call 90 ends.

As FIG. 7 illustrates, the ring back module 30 detects (or is notified of) a termination 92 of the call 90. When the calling party and/or the called party end the call 90 (such as by going on-hook or terminating a session), the ring back module 30 is informed of the end or termination 92 of the telephone or Voice-over Internet Protocol call 90. The ring back module 30 causes a subsequent, second call 94 to be placed to the communications server 40. The second call 94, for example, may be to a toll-free number associated with the communications server 40. The second call 94 may even require a fee per call or per minute. Regardless, during the second call 94, the ring back module 30 causes the calling party's communications device 10 to send, play, or present the identification sequence 70. The identification sequence 70, for example, may be sent as data or dual-tone modal frequencies that are detectable by the server-side ring back module 42. When the server-side ring back module 42 receives the identification sequence 70, the server-side ring back module 42 queries the ring back database 74 for the identification sequence 70. The ring back database 74 retrieves the personalized ring back 18 associated with the identification sequence 70. The server-side ring back module 42 then, at some time, causes the communications server 40 to send or communicate the personalized ring back 18 to the calling party's communications device 10. The communications server 40, for example, may send personalized ring back 18 during the second call 94 to the calling party's communications device 10. The ring back module 30 stores the personalized ring back 18 in the memory 36 of the calling party's communications device 10. The ring back module 30 also creates an entry in the address-to-ring tone database 80 and associates the personalized ring back 18 to the called party's communications address 50 (as FIG. 5 illustrated). When the calling party makes another, subsequent call to the called party's communications device 14, the ring back module 30 queries the address-to-ring back database 80 for the personalized ring back 18 that corresponds to the called party's communications address 50. The personalized ring back 18 alerts the calling party that the called party's communications device 14 is ringing, vibrating, or otherwise alerting to the call.

Figure 8:
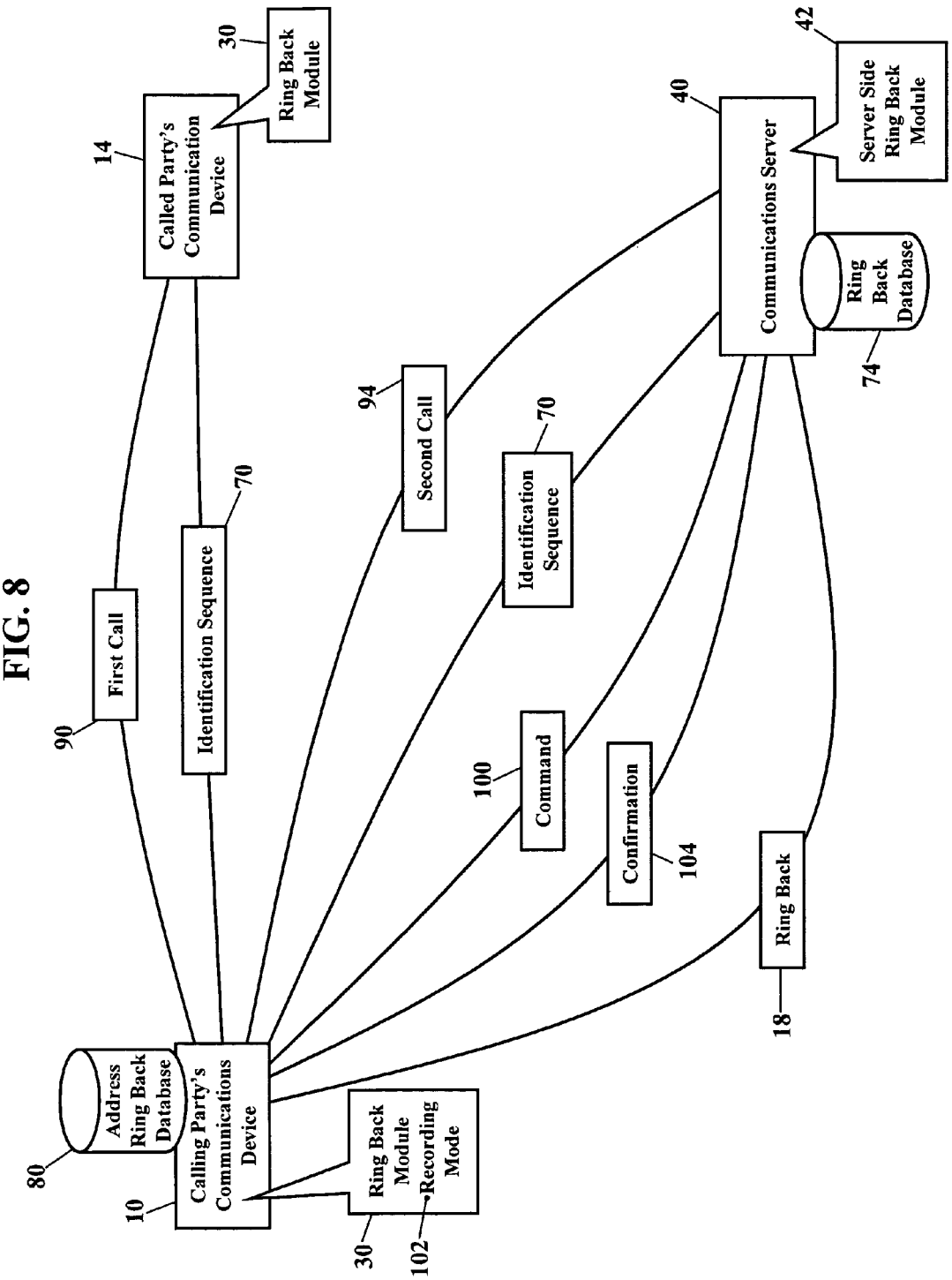
FIG. 8 illustrates another operating environment, according to exemplary embodiments.

FIG. 8 is another schematic illustrating the telephony ring back, according to exemplary embodiments. Much of FIG. 8 is similar to FIGS. 6 and 7 and, so, only briefly explained. The calling party's communications device 10 places the first call 90 to the called party's communications device 14. As the calling party and the called party conduct the first call 90, the called party's communications device 14 sends the identification sequence 70 to the calling party's communications device 10. The identification sequence 70 is stored in the memory (illustrated as reference numeral 36 in FIG. 2) of the calling party's communications device 10. When the call 90 ends, the ring back module 30 causes the subsequent, second call 94 to be placed to the communications server 40. During the second call 94, the ring back module 30 causes the calling party's communications device 10 to send, play, or present the identification sequence 70. The server-side ring back module 42 receives the identification sequence 70 and queries the ring back database 74 for the identification sequence 70. The server-side ring back module 42 retrieves the personalized ring back 18 associated with the identification sequence 70.

Here, though, the calling party's communications device 10 records the personalized ring back 18. During the established second call 94 between the calling party's communications device 10 and the communications server 40, the server-side ring back module 42 sends a command 100 to the calling party's communications device 10. The command 100 may be data, a message, or dual-tone multi-frequencies that are recognized or detectable by the ring back module 30. The command 100 causes the ring back module 30 to instruct the calling party's communications device 10 to enter a recording mode 102 of operation. When the recording mode 102 of operation is entered, the ring back module 30 causes the calling party's communications device 10 to send a confirmation 104 during the established second call 94 between the calling party's communications device 10 and the communications server 40. The confirmation 104 may be data or one or more dual-tone multi-frequencies that confirm the calling party's communications device 10 has entered or begun the recording mode 102 of operation. When the server-side ring back module 42 receives the confirmation 104, the server-side ring back module 42 causes the communications server 40 to begin streaming or playing the personalized ring back 18. The ring back module 30 in the calling party's communications device 10 then causes the processor (illustrated as reference numeral 38 in FIG. 2) to store or record the personalized ring back 18 to the memory 36 of the calling party's communications device 10. The ring back module 30 also associates the personalized ring back 18 to the called party's communications address 50 in the address-to-ring back database 80. When later calls are made to the same called party's communications device 14, the ring back module 30 queries the address-to-ring back database 80 for the personalized ring back 18 that corresponds to the called party's communications address 50. The personalized ring back 18 is retrieved and played or presented to the calling party to indicate that the call is being established.

Calls to the communications server 40 may be inconvenient. As explained above, when the ring back module 30 obtains the identification sequence 70, the ring back module 30 may call the communications server 40 to obtain the corresponding personalized ring back 18. The ring back module 30, for example, may immediately place the subsequent, second call 94 as soon as possible after either the calling party and/or the called party end the first call 90. If the subsequent, second call 94 is immediately placed to the communications server 40, though, the user may be prevented or delayed from making calls until the personalized ring back 18 is retrieved. Congestion within the communications network 16 may also prolong the subsequent, second call 94 to the communications server 40, thus further frustrating the user. The calling party, in other words, may have an unacceptable wait time before the personalized ring back 18 is received or recorded.

The ring back module 30, then, may be configured to make calls to the communications server 40. A user, for example, may configure the ring back module 30 to only or preferably call the communications server 40 during off-hours when the user is sleeping or less likely to use the calling party's communications device 10. The user, of course, may configure the ring back module 30 to call the communications server 40 immediately after the identification sequence 70 is received. The user may also configure the ring back module 30 to wait a predetermined time before calling the communications server 40. That is, after the ring back module 30 receives the identification sequence 70 and when the calling party and the called party end the first call 90, the ring back module 30 initializes or sets a countdown timer. When the countdown timer expires, the ring back module 30 then initiates the second call 94 to the communications server 40 to obtain the personalized ring back 18.

Multiple personalized ring backs may also be "batch" delivered. Because the ring back module 30 may be configurable, the user may desire that all personalized ring backs are obtained during a single call to the communications server 40. That is, as the calling party makes multiple calls throughout a day, for example, numerous called parties may specify personalized ring backs. As the ring back module 30 receives the identification sequence 70 for each corresponding called party, the ring back module 30 sequentially stores the identification sequences in memory. Then, perhaps during off-hours, the ring back module 30 then initiates the second call 94 to the communications server 40. The ring back module 30 sends all the identification sequences 70 received and stored during the day (or some other configurable time period). During a single call to the communications server 40, then, the server-side ring back module 42 retrieves all the corresponding personalized ring backs. The ring back module 30, for example, may serially transmit or communicate a string of identification sequences, with each individual identification sequence 70 corresponding to a different called party's personalized ring back. When the second call 94 to the communications server 40 is established, the personalized ring backs 18 may then be batch or serially communicated to the calling party's communications device 10. The ring back module 30 receives and/or records the multiple personalized ring backs, and each personalized ring back 18 is associated to the corresponding called party's communications address 50 in the address-to-ring tone database 80.

Figure 9:
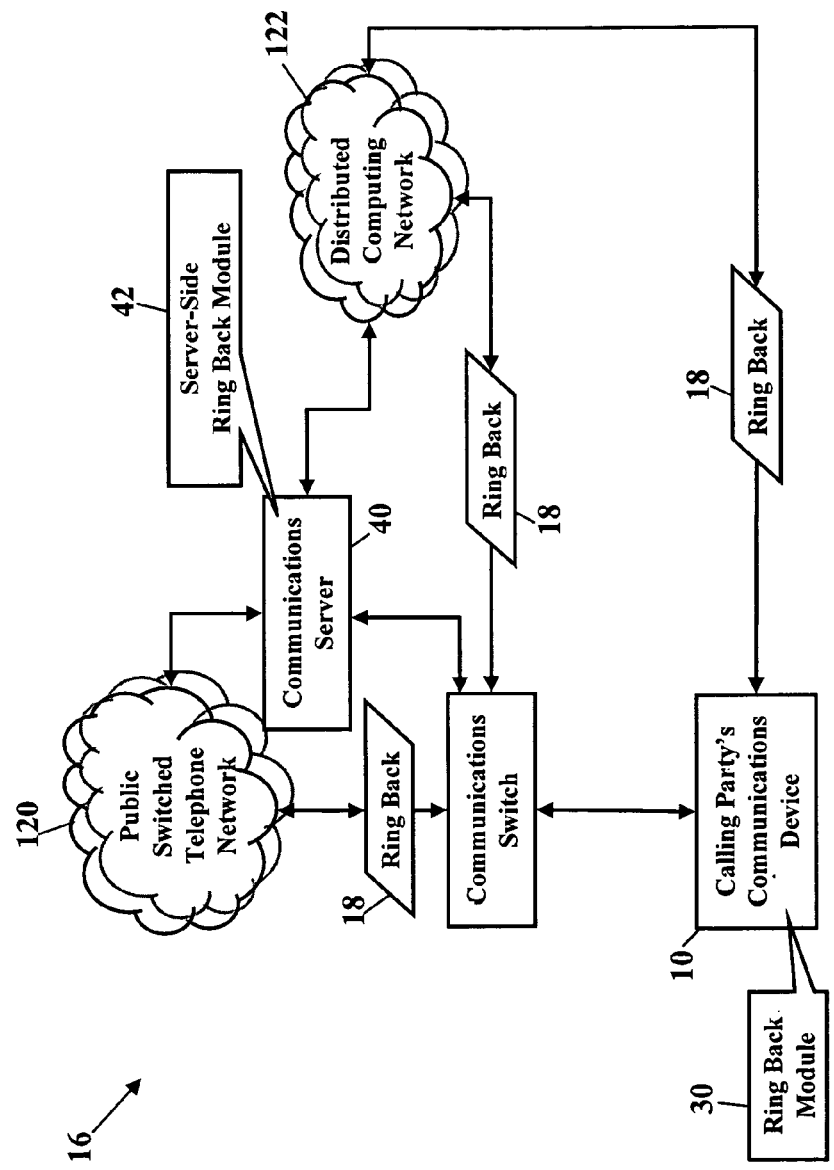
FIGS. 9-11 are schematics illustrating various communications devices for presenting ring backs, according to exemplary embodiments.

FIG. 9 illustrates another operating environment, according to exemplary embodiments. Here the ring back module 30 and the server-side ring back module 42 may interface with a Public Switched Telephone Network 120 and with a distributed computing network 122 (such as the Internet or local-area network). As those of ordinary skill in the art understand, this operating environment may utilize a packet protocol, such as the Session Initiation Protocol (SIP). This operating environment may also utilize voice service protocols, triggers, and/or operations that allow the Public Switched Telephone Network 120 and the distributed computing network 122 to interoperate. The communications server 40, for example, may interface with a packet-based "softswitch" that uses software control to provide voice, data, and video services by dynamically changing its connection data rates and protocols types. The communications server 40 may alternatively or additionally include Advanced Intelligent Network (AIN) componentry. This operating environment, however, is well understood in the art and will not be further described. If a reader desires a more detailed explanation, the reader is directed to U.S. Pat. No. 5,430,719 issued to Weisser (Jul. 4, 1995) and to U.S. Pat. No. 5,917,817 issued to Dunn et al. (Jun. 29, 1999.

Figure 10:
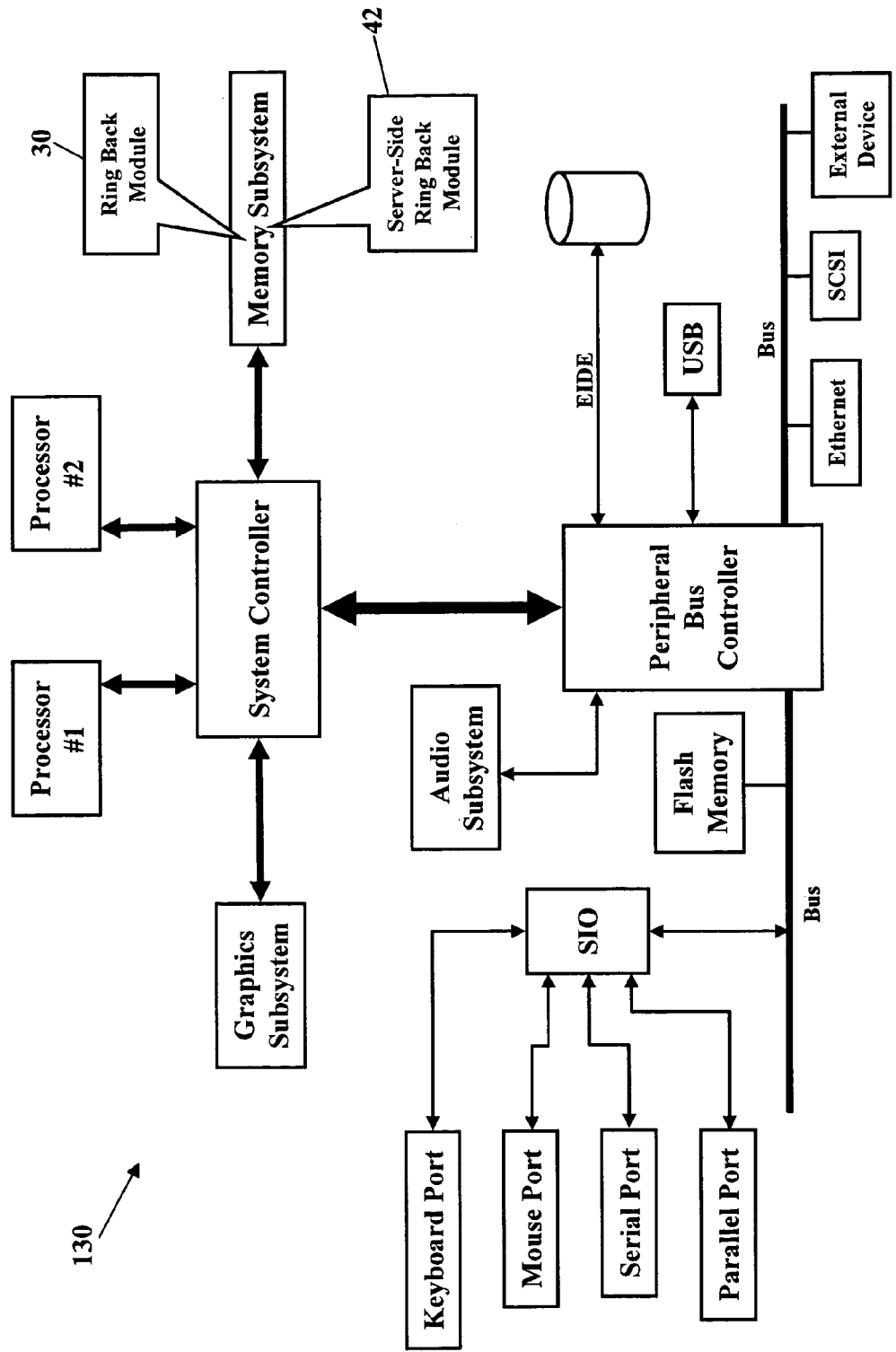
Figure 11:
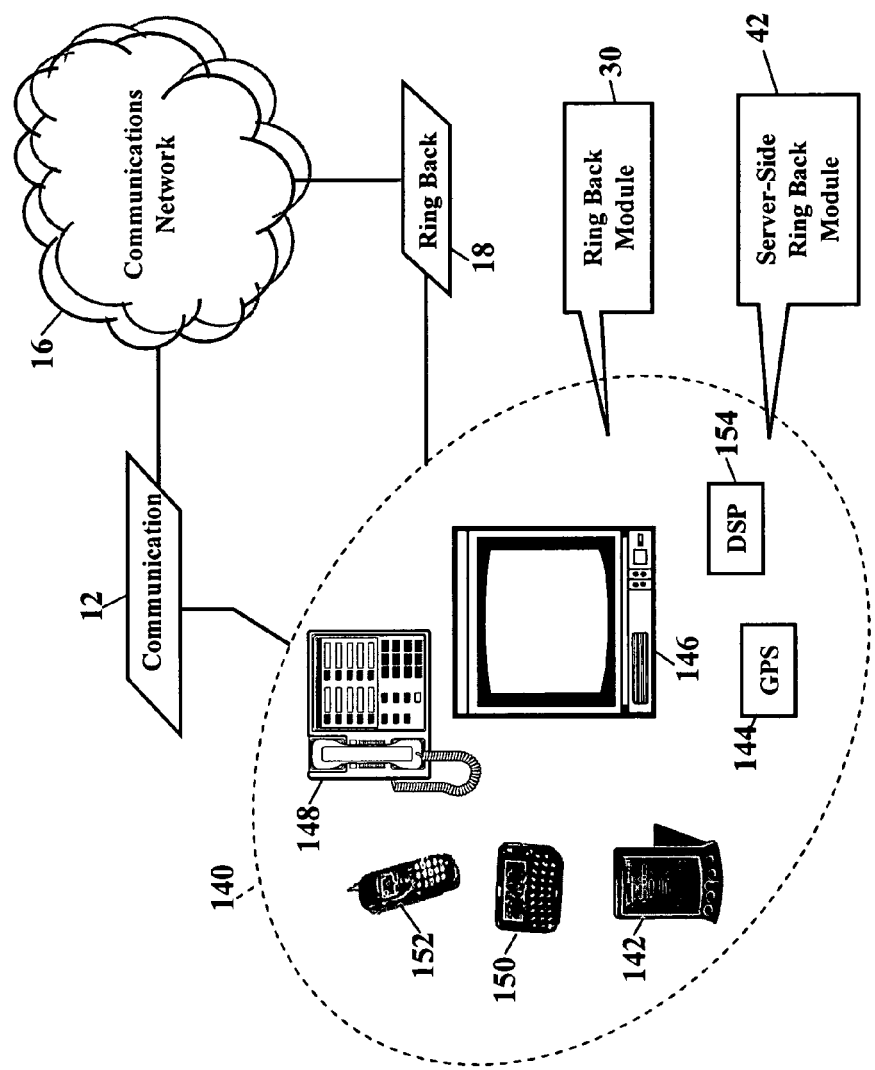

FIGS. 10-11 are schematics illustrating still more exemplary embodiments. FIG. 10 is a generic block diagram illustrating the ring back module 30, and/or the server-side ring back module 42, may operate within a processor-controlled device 130. The ring back module 30 and/or the server-side ring back module 42 may be stored in a memory subsystem of the processor-controlled device 130. One or more processors communicate with the memory subsystem and execute the ring back module 30 and/or the server-side ring back module 42. Because the processor-controlled device 130 illustrated in FIG. 10 is well-known to those of ordinary skill in the art, no detailed explanation is needed.

FIG. 11 illustrates that the ring back module 30, and/or the server-side ring back module 42, may also entirely or partially operate within various other communications devices 140. As FIG. 11 shows, the ring back module 30 and/or the server-side ring back module 42 may operate in a personal digital assistant (PDA) 142, a Global Positioning System (GPS) device 144, an interactive television 146, an Internet Protocol (IP) phone 148, a pager 150, a cellular/satellite phone 152, or any computer system and/or communications device utilizing a digital signal processor (DSP) 154. The calling party's communications device 10, and/or the called party's communications device 14, may also include watches, radios, vehicle electronics, clocks, printers, gateways, and other apparatuses and systems.

Figure 12:
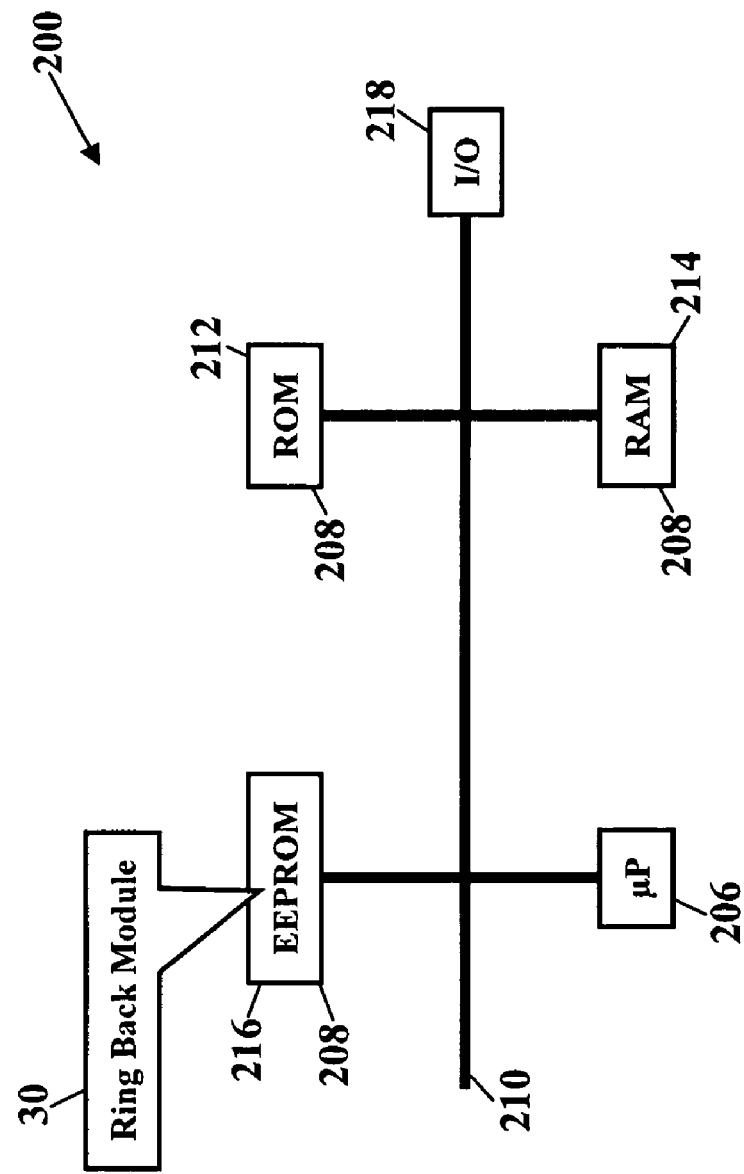
FIGS. 12-14 are schematics further illustrating various communications devices for presenting ring backs, according to exemplary embodiments.
Figure 14:
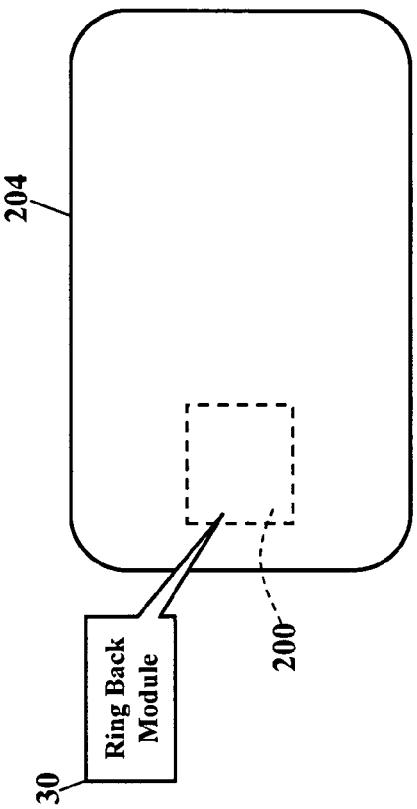
Figure 13:
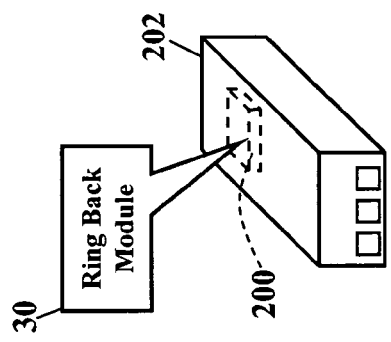

FIGS. 12-14 are schematics further illustrating various communications devices for presenting ring backs, according to exemplary embodiments. FIG. 12 is a block diagram of a Subscriber Identity Module 200, while FIGS. 13 and 14 illustrate, respectively, the Subscriber Identity Module 200 embodied in a plug 202 and the Subscriber Identity Module 200 embodied in a card 204. As those of ordinary skill in the art recognize, the Subscriber Identity Module 200 may be used in conjunction with many communications devices (such as those illustrated in FIGS. 1-11). The Subscriber Identity Module 200 stores user information (such as the user's International Mobile Subscriber Identity, the user's $K_i$ number, and other user information) and any portion of the ring back module 30. As those of ordinary skill in the art also recognize, the plug 202 and the card 204 each interfaces with the communications device. While exemplary embodiments are applicable to any standard, some such standards are GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 12 is a block diagram of the Subscriber Identity Module 200, whether embodied as the plug 202 of FIG. 13 or as the card 204 of FIG. 14. Here the Subscriber Identity Module 200 comprises a microprocessor 206 (µP) communicating with memory modules 208 via a data bus 210. The memory modules 208 may include Read Only Memory (ROM) 212, Random Access Memory (RAM) and/or flash memory 214, and Electrically Erasable-Programmable Read Only Memory (EEPROM) 216. The Subscriber Identity Module 200 stores some or all of the ring back module 30 in one or more of the memory modules 208. FIG. 12 shows the ring back module 30 residing in the Erasable-Programmable Read Only Memory 216, yet the ring back module 30 could alternatively or additionally reside in the Read Only Memory 212 and/or the Random Access/Flash Memory 214. An Input/Output module 218 handles communication between the Subscriber Identity Module 200 and the communications device. Because Subscriber Identity Modules are well known in the art, this patent will not further discuss the operation and the physical/memory structure of the Subscriber Identity Module 200. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 15:
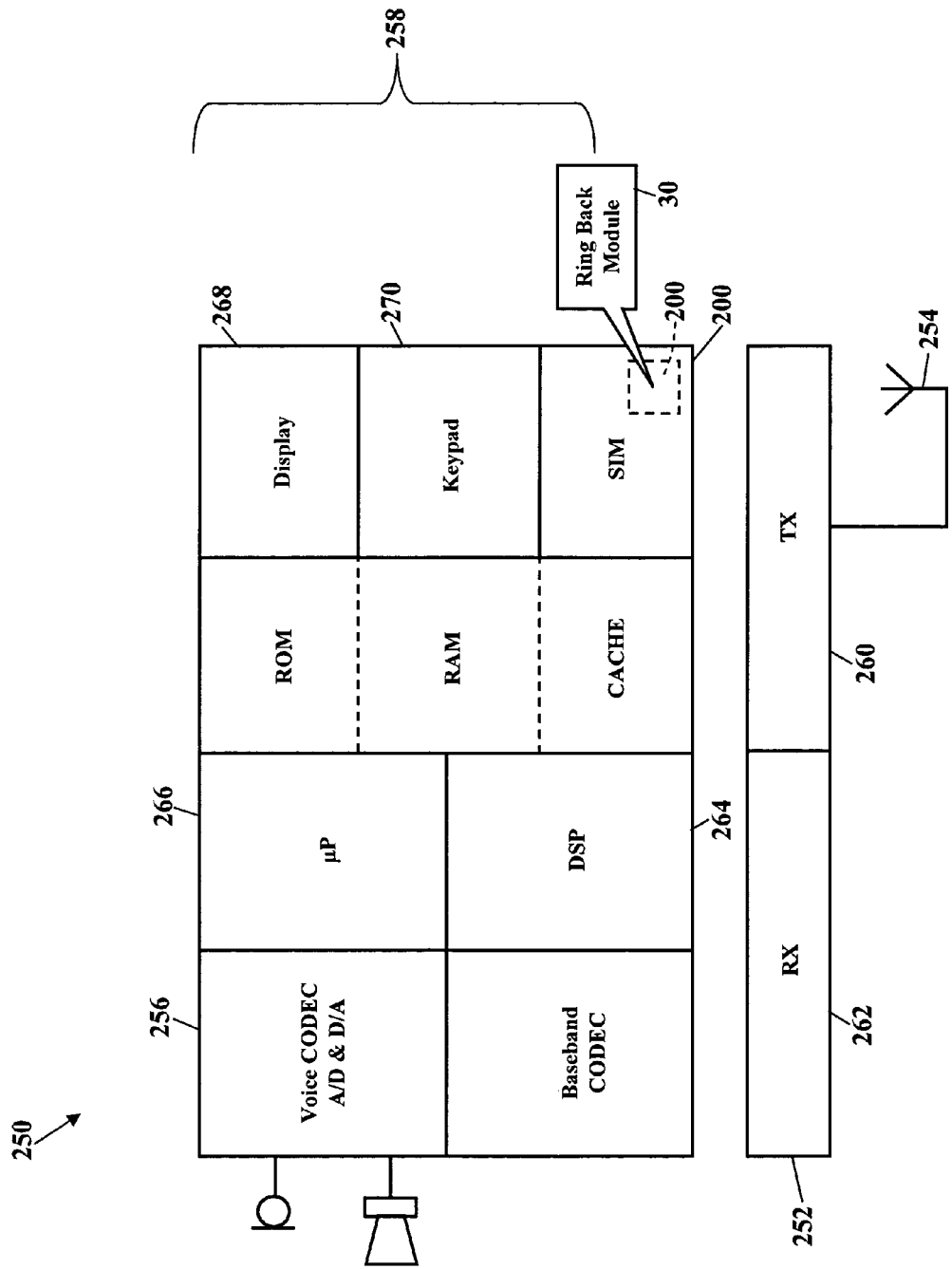
FIG. 15 is another schematic further illustrating various communications devices for presenting ring backs, according to exemplary embodiments.

FIG. 15 is a schematic further illustrating various communications devices for presenting ring backs, according to exemplary embodiments. FIG. 15 is a block diagram of another communications device 250 utilizing the ring back module 30. Here the communications device 250 comprises a radio transceiver unit 252, an antenna 254, a digital baseband chipset 256, and a man/machine interface (MMI) 258. The transceiver unit 252 includes transmitter circuitry 260 and receiver circuitry 262 for receiving and transmitting radio-frequency (RF) signals. The transceiver unit 252 couples to the antenna 254 for converting electrical current to and from electromagnetic waves. The digital baseband chipset 256 contains a digital signal processor (DSP) 264 and performs signal processing functions for audio (voice) signals and RF signals. As FIG. 15 shows, the digital baseband chipset 256 may also include an on-board microprocessor 266 that interacts with the man/machine interface (MMI) 258. The man/machine interface (MMI) 258 may comprise a display device 268, a keypad 270, and the Subscriber Identity Module 200. The on-board microprocessor 266 may perform TDMA, CDMA, GSM or other protocol functions and control functions for the radio circuitry 260 and 262, for the display device 268, and for the keypad 270. The on-board microprocessor 266 may also interface with the Subscriber Identity Module 200 and with the ring back module 30. Because the functional architecture of the communications device 250 is well known to those of ordinary skill in the art, the communications device 250 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997).

Exemplary embodiments may be applied to any signaling standard. As those of ordinary skill in the art recognize, FIGS. 12-15 may illustrate a Global System for Mobile (GSM) communications device. That is, the communications device may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards.

Figure 16:
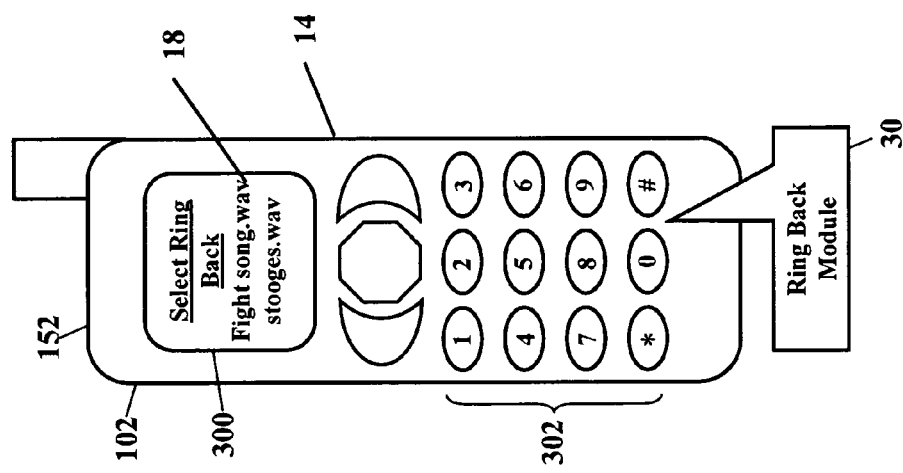
FIG. 16 is another schematic illustrating this ring back service, according to exemplary embodiments.

FIG. 16 is another schematic illustrating this ring back service, according to exemplary embodiments. FIG. 16 illustrates a graphical user interface 300 that may be displayed by the called party's communications device 14. The graphical user interface 300 allows the called party to select the personalized ring back 18 that is presented to the calling party. The graphical user interface 300 may provide a selection of ring backs to the called party. The called party may use a keypad 302 or other control to scroll through the graphical user interface 300 and to select the desired personalized ring back 18. The called party may then associate the calling party's communications address with the desired personalized ring back 18. The association may even be automatically performed by the ring back module 30, such as when a calling number or Internet Protocol address is received with an incoming call or incoming communication. Once the called party selects the desired personalized ring back 18, the ring back module 30 assigns the identification sequence 70 to the personalized ring back 18. The identification sequence 70 may be a random or sequential alphanumeric combination that is chosen by the ring back module 30. The ring back module 30 may perform a survey or check of all identification sequences to ensure that the calling number or Internet Protocol address is not assigned or associated with multiple ring backs. Once the identification sequence 70 is verified, the ring back module 30 will then send the identification sequence 70 upon receipt or indication of subsequent calls or communications from the same calling number or Internet Protocol address (as the above paragraphs explained).

Figure 17:
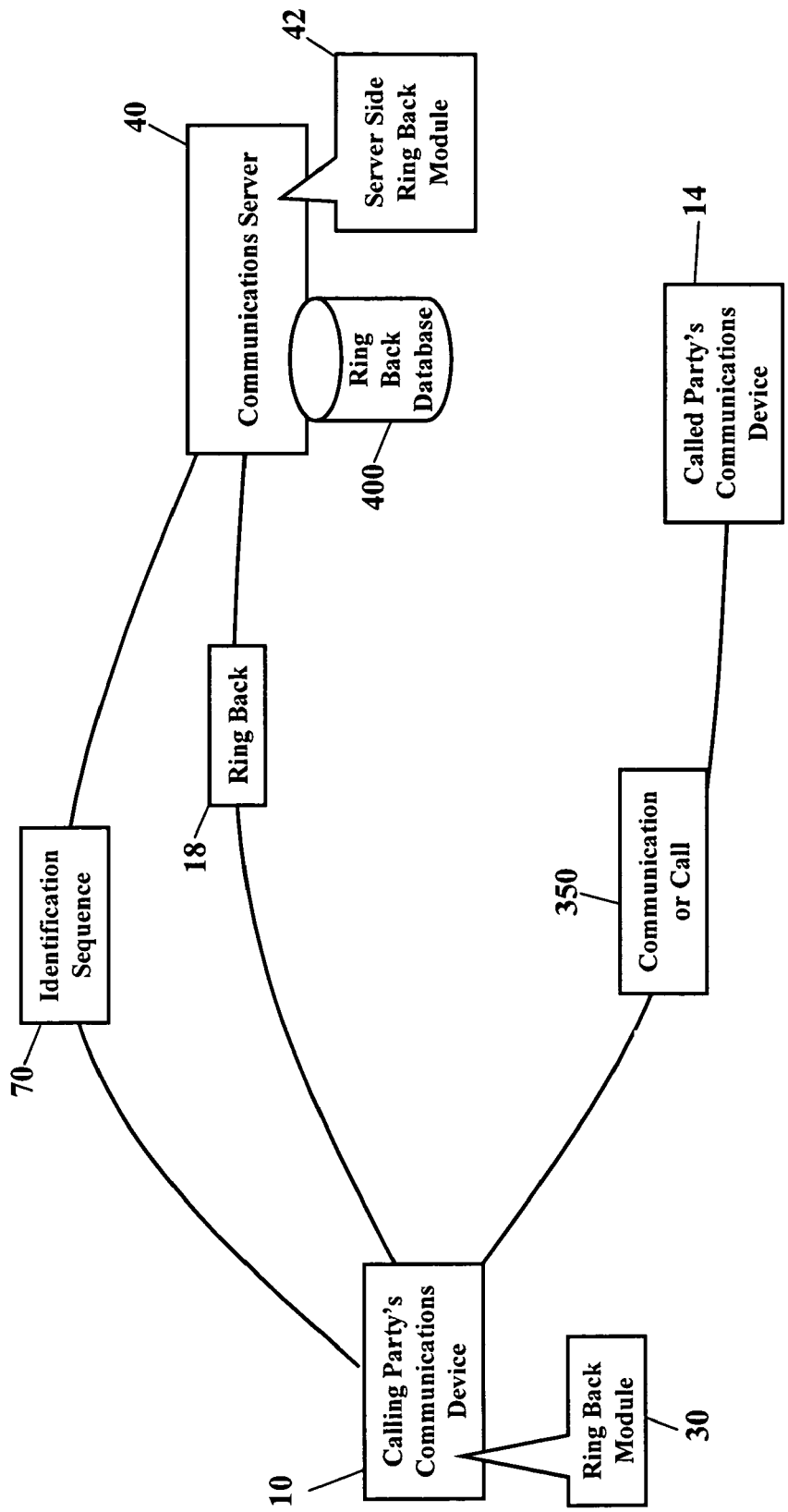
FIG. 17 is a schematic illustrating a network-centric ring back service, according to exemplary embodiments.

FIG. 17 is a schematic illustrating a network-centric ring back service, according to exemplary embodiments. Here the server-side ring back module 42, operating in the communications server 40, provides network-based control of the ring back service. When the calling party's communications device 10 sends a communication or places a call 350 to the called party's communications device 14, the server-side ring back module 42 is notified of the call or communication 350. The call or communication 350, for example, may be routed to or through the communications server 40. The communications server 40, alternatively or additionally, may be notified of the call or communication 350 by network signaling or messaging. When the server-side ring back module 42 learns of the call or communication 350, for example, the server-side ring back module 42 is also informed of the calling number and the called number. If an electronic communication is sent, the server-side ring back module 42 is informed of the sender's Internet Protocol address and the recipient's Internet Protocol address. Regardless, the server-side ring back module 42 is notified of each party's communications address.

The server-side ring back module 42 then selects the identification sequence 70. The server-side ring back module 42 queries a server-side ring back database 400 for each party's communications address. The server-side ring back database 400 maps or relates a sender/caller communications address and a recipient/callee communications address to the associated identification sequence 70. As the communicating parties converse or conduct a session, the server-side ring back module 42 causes the communications server 40 to interject and communicate the corresponding identification sequence 70 (e.g., detectable data, tones, or messages, as the above paragraphs explained) to the calling party's communications device 10. The calling party's communications device 10 may then make a subsequent call or communication to the communications server 40 and send the identification sequence 70. The server-side ring back module 42 obtains the identification sequence 70, retrieves the associated ring back 18, and sends the personalized ring back 18 to the calling party's communications device 10.

Network selection of the ring back 18 is also possible. The called party subscriber might provide a list of approved ring backs. The list could include any content, such as music, movies, pictures, streaming audio/video, or other content. The subscriber could then let the server-side ring back module 42 select the ring back on behalf of the subscriber. That is, when the called party subscriber receives a communication (such as an email or a telephone call), the calling party would experience the ring back 18 selected from the list. The server-side ring back module 42 could use any method of selecting the ring back 18 from the approved list. The ring server-side ring back module 42, for example, could randomly select from the list, or the server-side ring back module 42 could sequentially work through the list with each successive communication. However the ring back 18 is selected, the server-side ring back module 42 may select the ring back 18 on behalf of the subscriber.

Exemplary embodiments may also be applied to an Internet Protocol environment. Exemplary embodiments may analyze a header portion and/or a payload portion of one or more packets of data. The header portion and/or the payload portion may include data representing a calling number, a called number, a sender's Internet Protocol address, and/or a recipient's Internet Protocol address. Exemplary embodiments may then use this packetized data to retrieve the identification sequence 70 and/or the personalized ring back 18, as the above paragraphs explained.

Figure 18:
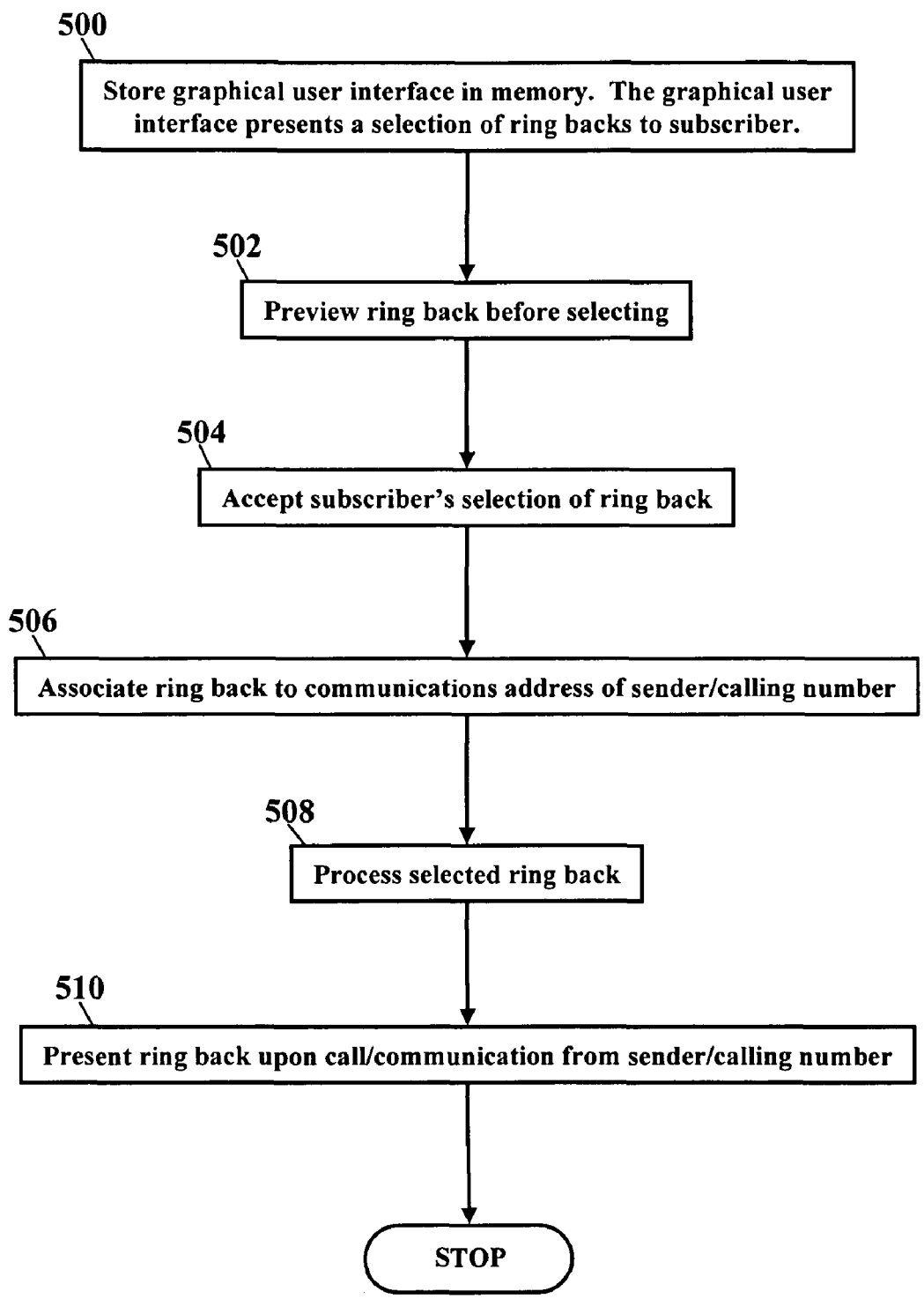

FIG. 18 is a flowchart illustrating a method of providing the personalized ring back 18, according to exemplary embodiments. A graphical user interface is stored in memory (Block 500). The graphical user interface may be stored in the memory of a computer (such as the computer server 22), and the graphical user interface is accessed/downloaded via the Internet. The graphical user interface may additionally or alternatively be locally stored in the memory of a communications device. The graphical user interface presents a selection of ring backs to the subscriber. The selection of ring backs allows the subscriber to specify the ring back to be presented on the calling party's communications device 10. The subscriber may be allowed to preview a ring back (Block 502), thus allowing the subscriber to see, hear, feel, and/or otherwise experience the ring back before selection. The subscriber's selection of a ring back is accepted (Block 504), and the subscriber is allowed to associate the ring back to a telephone number or Internet Protocol address of the calling party (Block 506). The selected ring back is processed (Block 508). The ring back is presented to a calling party or sender to indicate the subscriber's communications device is alerting of an incoming communication (Block 510).

FIG. 19 is another flowchart illustrating another method of providing the personalized ring back 18, according to exemplary embodiments. A first call is placed to a called number (Block 600). An identification sequence 70 is received during the first call (Block 602). A second call is placed to a server when the first call is completed (Block 604). An identification sequence 70 is sent to the server during the second call (Block 606). The personalized ring back 18 is received during the second call (Block 608) and stored (Block 610). When subsequent calls are made to the called number, the personalized ring back is retrieved from memory and presented to the calling party (Block 612).

The terms "processed," "process," "processing," and variants, as used herein, encompass any event from the time the calling party's communications device initiates a communication to the termination of the communication. The terms "processed," "process," "processing," and variants include storing the ring back in memory, routing a voice path, signaling setup, and intelligence queries (e.g., Local Number Portability queries, queries to retrieve Calling/Called Name/Number information, AIN queries, and standard signaling messages to determine call routing paths). The terms "processed," "process," "processing," and variants also include monitoring an established telephone call for possible DTMF entry, switch hook flash, other events that indicate a party on the telephone call has requested something, and delivery of call waiting tones and data. The terms "processed," "process," "processing," and variants also include identification of packets, of packet headers, and of the payload contents of packets. The terms "processed," "process," "processing," and variants include deciphering the payload contents of a packet and acting on those payload contents. The terms "processed," "process," "processing," and variants also include storing ring back selections in memory, retrieving those ring back selections, and communicating those ring back selections to the calling party. The terms "processed," "process," "processing," and variants, however, also encompass billing activities and measurements at a switch or any other network element.

Censorship is also permissible. The subscriber to this service can specify the ring back to be presented on a calling party's communications device. The calling party, however, may choose to block or censor the called party's selected ring back. The calling party may not approve of certain content for the ring back. The calling party may dislike some ring backs. The calling party, for example, may disapprove of lyrics, scenes, or other content in the ring back. This invention would also provide the calling party an opportunity to block or censor the called party's selected ring back. The calling party may maintain a profile in the ring back database 24. When the called party's ring back is retrieved, the ring back module 30 could cross-reference the called party's ring back to the calling party's list of approved/censored/block ring backs. If a match is found, the ring back module 30 would approve/decline the selected ring back. The calling party's profile may specify a default ring back to be presented to the calling party, in the event the subscriber's selected ring back is censored/blocked. The calling party's profile may even demand a mandatory ring back to be presented to the calling party, regardless of the subscriber's selected ring back.

Exemplary embodiments may also be applied to busy signals. As most people know, when a telephone line is dedicated for a phone call and/or a data session, another caller hears a busy signal. This busy signal indicates the called party's line is engaged in a telephone/data session (e.g., Internet Call Waiting). Exemplary embodiments could also be applied to customizable busy signals. That is, the called party uses this service to determine the type of busy signal heard by the calling party. The calling party might hear a favorite song, view a picture, view portions of a movie, or see other graphics. The subscriber might even select personal pictures, self-composed music, and/or streamed audio and/or video content (such as radio, stock quotes, news, weather, and/or advertisements). The called party might also specify a busy signal by electronic calendar entries, such as the day of the week, the time of day, and/or appointments in the calendar. The called party subscriber may even associate particular busy signals to particular calling parties, thus providing a variety of personalized busy signals.

The ring back module (shown as reference numeral 20 in FIGS. 2-17) may be physically embodied on or in a computer-readable medium. This computer-readable medium may include CD-ROM, DVD, tape, cassette, disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1501 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the ring back module to be easily disseminated. A computer program product for providing ring backs to a calling party comprises the computer-readable medium and processor-readable instructions for performing a method of providing ring backs, as the above paragraphs explained.

The ring back module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

Exemplary embodiments may be applied regardless of networking environment. The communications network 16 may be a cable network operating in the radio-frequency domain and/or the Internet Protocol (IP) domain. The communications network 16, however, may also include a distributed computing network, such as the Internet (sometimes alternatively known as the "World Wide Web"), an intranet, a local-area network (LAN), and/or a wide-area network (WAN). The communications network 16 may include coaxial cables, copper wires, fiber optic lines, and/or hybrid-coaxial lines.

The communications network 16 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 16 may even include powerline portions, in which signals are communicated via electrical wiring. The concepts described herein may be applied to any wireless/wireline communications network, regardless of physical componentry, physical configuration, or communications standard(s).

While exemplary embodiments have been described with respect to various features, aspects, and embodiments, those skilled and unskilled in the art will recognize exemplary embodiments are not so limited. Other variations, modifications, and alternative embodiments may be made without departing from the spirit and scope of the claims.

What is claimed is:

1. A method of providing a ring back to a calling party's communications device, comprising:
    placing a first call to a called number;
    receiving, during the first call, an identification sequence;
    placing a second call to a server when the first call is completed;
    sending the identification sequence to the server during the second call;
    receiving the ring back associated with the identification sequence during the second call;
    storing the ring back in memory of the calling party's communications device;
    retrieving the ring back from the memory when subsequent calls are made to the called number; and
    presenting the ring back on the calling party's communications device to indicate the called number is ringing.

2. The method according to claim 1, further comprising associating the ring back to the called number.

3. The method according to claim 1, further comprising receiving the identification sequence as a burst of data during the first call to the called number.

4. The method according to claim 1, wherein receiving the ring back comprises receiving the ring back during the call to the server.

5. The method according to claim 1, further comprising receiving a command from the server to record the ring back.

6. The method according to claim 5, further comprising recording the ring back to the memory of the calling party's communications device.

7. The method according to claim 1, further comprising receiving, during the first call, a default ring back tone that indicates the called number is ringing.

8. A processor-controlled device that provides a ring back, the processor-controlled device operative to:
    placing a first call to a called number;
    receiving, during the first call, an identification sequence;
    placing a second call to a server when the first call is completed;
    sending the identification sequence to the server during the second call;
    receiving the ring back associated with the identification sequence during the second call;
    storing the ring back in memory of the calling party's communications device;
    retrieving the ring back from the memory when subsequent calls are made to the called number; and
    presenting the ring back on the calling party's communications device to indicate the called number is ringing.

9. The processor-controlled device according to claim 8, further operative to associate the ring back to the called number.

10. The processor-controlled device according to claim 8, further operative to receive the identification sequence as a burst of data during the first call to the called number.

11. The processor-controlled device according to claim 8, further operative to receive the ring back during the call to the server.

12. The processor-controlled device according to claim 8, further operative to receive a command from the server to record the ring back.

13. The processor-controlled device according to claim 12, further operative to record the ring back to the memory of the calling party's communications device.

14. The processor-controlled device according to claim 8, further operative to receive, during the first call, a default ring back tone that indicates the called number is ringing.

15. A computer readable storage medium storing processor-executable instructions for performing a method of providing a ring back to a calling party's communications device, the method comprising:
    placing a first call to a called number;
    receiving, during the first call, an identification sequence;
    placing a second call to a server when the first call is completed;
    sending the identification sequence to the server during the second call;
    receiving the ring back associated with the identification sequence during the second call;
    storing the ring back in memory of the calling party's communications device;
    retrieving the ring back from the memory when subsequent calls are made to the called number; and
    presenting the ring back on the calling party's communications device to indicate the called number is ringing.

16. The computer readable storage medium according to claim 15, further comprising instructions for associating the ring back to the called number.

17. The computer readable storage medium according to claim 15, further comprising instructions for receiving the identification sequence as a burst of data during the first call to the called number.

18. The computer readable storage medium according to claim 15, further comprising instructions for receiving the ring back during the call to the server.

19. The computer readable storage medium according to claim 15, further comprising instructions for receiving a command from the server to record the ring back.

20. The computer readable storage medium according to claim 19, further comprising instructions for recording the ring back to the memory of the calling party's communications device.

* * * * *